C. D. MILLER.
VALVE TIGHTENER FOR TIGHTENING VALVES IN PNEUMATIC TIRE STEMS.
APPLICATION FILED FEB. 28, 1916.
1,187,539.
Patented June 20, 1916.
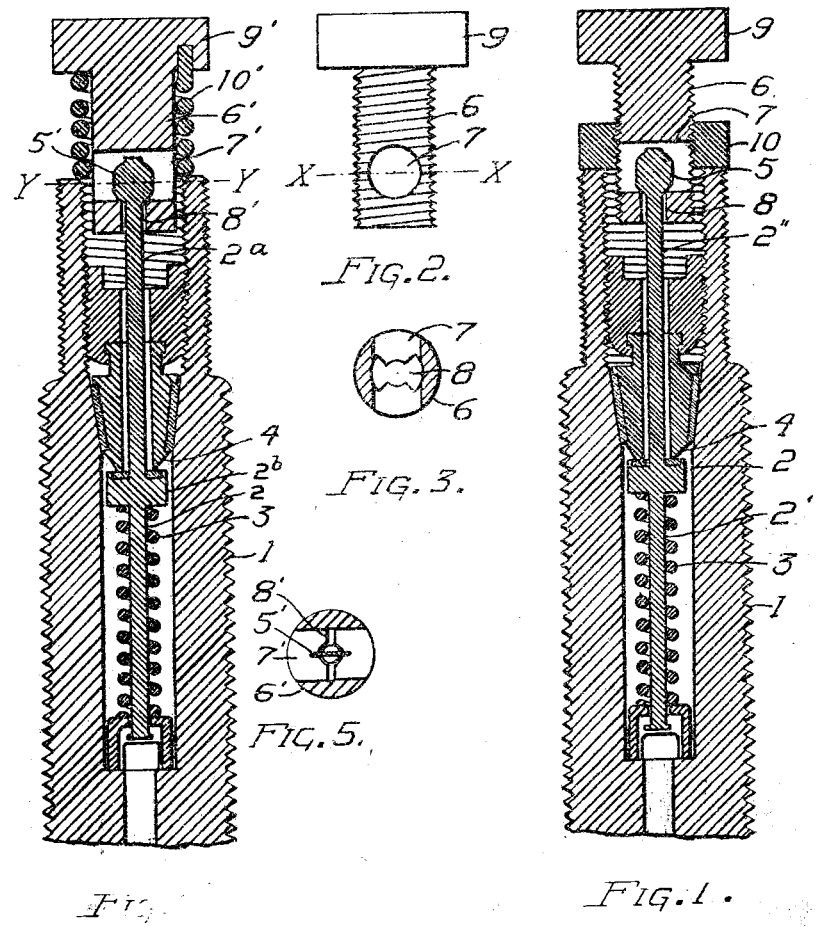

UNITED STATES PATENT OFFICE.

COSBY D. MILLER, OF ST. JOSEPH, MISSOURI.

VALVE-TIGHTENER FOR TIGHTENING VALVES IN PNEUMATIC-TIRE STEMS.

1,187,539.     Specification of Letters Patent.     Patented June 20, 1916.

Application filed February 28, 1916. Serial No. 80,916.

*To all whom it may concern:*

Be it known that I, COSBY D. MILLER, a citizen of the United States, residing at St. Joseph, in the county of Buchanan and State of Missouri, have invented certain new and useful Improvements in Valve-Tighteners for Tightening Valves in Pneumatic-Tire Stems, of which the following is a specification, reference being had therein to the accompanying drawing.

My invention relates to improvements in that class of valve tighteners which are used for tightening the valves that are in pneumatic tire stems, and the objects of my improvements are, first, to provide a simple, substantial and durable device of this class, by the use of which, the air inlet valve of an ordinary tire stem, is tightly held against its valve seat, when said tire is in use, regardless of the tension of the conventional spring, by which said valve is ordinarily seated, thereby permitting the use of a very weakly tensioned spring, which eliminates much of the labor exercised in filling said pneumatic tire with compressed air; second, to so construct the tightener that it can be used as a separate ready attachment for the ordinary tire stem and valve for tightly closing said valve, when the same has become leaky, by reason of deficient tension of its said conventional spring; thereby overcoming the necessity of deflating the tire, removing the valve and spring, replacing the same with new ones, and thereafter performing the labor of reinflating the tire. I attain these objects by the devices illustrated in the accompanying drawings, in which:—

Figure 1 is an enlarged section cut longitudinally through the center of an ordinary tire stem and the tightener, showing the latter as it appears when in use. Fig. 2 is an enlarged side elevation of the tightener, seen in Fig. 1. Fig. 3 is a horizontal section of the tightener, on the line X X, seen in Fig. 2, looking downward. Fig. 4 is a section similar to Fig. 1, of one of the various other forms in which the tightener may be constructed. Fig. 5 is a horizontal section of the tightener on the line Y Y, seen in Fig. 4, looking downward.

In the preferred form of my invention, as seen in Figs. 1, 2 and 3, tire stem 1 is provided with valve 2, actuated to move upward, by spring 3, and slightly press against valve seat 4, for closing said valve, which latter is provided with lower and upper valve stems 2′ and 2″, respectively. Stem 2″ has a pair of projections 5, formed on the diametrically opposite sides of the upper end portion thereof. All of the previously described parts are old, and form elements of the well known tire stems, now generally in use.

It has been found in actual practice, that spring 3 is made with such weak tension, that valve 2 is not firmly pressed against valve seat 4, and that such valves are therefore frequently leaky. It has also been found said spring must necessarily be as described, in order to allow said valve to be easily opened by pressure of incoming air, which avoids extra labor of pumping air, when inflating a pneumatic tire, not shown. In order to firmly press valve 2 against its valve seat 4, regardless of the tension of spring 3, I have devised the lifting member 6, which has annular opening 7 formed transversely through its lower end portion. Said member has slot 8 formed therein, extending from said opening through said lower end portion. Said slot is adapted to permit free passage therethrough, into opening 7, of the upper end of stem 2″, and the therewith formed projections 5. Said lifting member has screw threads formed on its outer surface, and thumb nut 9 formed on its upper end. Collar 10 is screwed onto said member and is adapted to be rotated thereon and to rest upon the top edge of tire stem 1, for lifting said lifting member.

In operation of the parts, while in the position seen in Fig. 1, valve 2 is tightly pressed against seat 4, by grasping thumb nut 9 with one hand and thereby holding the lifting member 6 against rotation and rotating collar 10 with the other hand, thus lifting member 6. This presses the lower surface of opening 7 more firmly against the bottom edges of projections 5, thereby upwardly straining valve stem 2″, by which valve 2 is tightly pressed against seat 4. By reversing the described operation, the parts are loosened, after which said lifting member is rotated ninety degrees, thereby bringing slot 8 into register with projections 5, after which said lifting member and the thereon screw connected collar 10 are lifted from tire stem 1. By reversing the last described operations, said member is moved to the position shown in Fig. 1, after which the valve tightening operations are repeated as described. During the tightening operations, the curved bottom of opening 7 adjusts the lower edges of projections 5, to position on the center of said bottom, when the parts are strained as described. While I have shown and described my invention in the foregoing manner, it is evident said lifting member 6 could be lifted and tightly held by devices of various forms, other than the screw threaded collar 10, and that slots of different forms than the slot 8 could be used, without departing from the spirit of my invention, which I reserve the right to do. One of such other forms of lifting devices and one of such other forms of slots are shown in Figs. 4 and 5, in which: the lifting member 6' is provided with thumb nut 9', formed on its upper end.

Opening 7' is of the same form and proportions as the previously described opening 7, while it will be seen in Fig. 5, that the slot 8' is slightly different in contour from the slot 8, seen in Fig. 3.

Spring 10' encircles member 6', with its lower end resting on the upper end of tire stem 1'. The upper end of said spring is tightly inserted in an aperture in thumb nut 9', for holding said spring in place, when the described valve tightener is not in use. Spring 10' is adapted to press against said thumb nut, which lifts said nut and the therewith formed member 6'. Said member, by its engagement with projections 5', lifts the latter and the therewith formed valve stem $2^a$, which latter lifts valve $2^b$, thereby tightly closing said valve.

Having fully described my invention, what I claim as new and desire to secure by Letters Patent, is:—

A detachable valve tightener for tightening the valve in a pneumatic tire stem, said valve having a valve stem therefor and projections formed laterally on the upper end of said valve stem, said tightener comprising a lifting member having an opening formed laterally through the lower end portion thereof and a slot formed therein said slot extending from said opening through the lower extremity of said member, said slot being adapted to be passed over said valve stem projections to a point below them and to be turned transversely to said valve stem projections for detachably engaging the latter with the bottom of said opening; and lifting means whereby said lifting member is lifted for lifting and thereby tightly closing said valve.

In testimony whereof I affix my signature in the presence of two witnesses.

COSBY D. MILLER.

Witnesses:
   JOHN J. HINTON,
   E. O. HARVEY.